US008605220B2

(12) United States Patent
Casper et al.

(10) Patent No.: US 8,605,220 B2
(45) Date of Patent: Dec. 10, 2013

(54) GENERATION OF VIDEO TRANSITIONS ON AN AUXILIARY BUS USING A VIDEO SWITCHER

(75) Inventors: David Alan Casper, Nevada City, CA (US); Michael Joseph Krim, Waltham, MA (US); John David Willis, Slough (GB)

(73) Assignee: GVBB Holdings S.A.R.L., Luxembourg (LU)

( * ) Notice: Subject to any disclaimer, the term of this patent is extended or adjusted under 35 U.S.C. 154(b) by 314 days.

(21) Appl. No.: 12/733,320

(22) PCT Filed: Aug. 30, 2007

(86) PCT No.: PCT/US2007/019110
§ 371 (c)(1),
(2), (4) Date: Feb. 23, 2010

(87) PCT Pub. No.: WO2009/029072
PCT Pub. Date: Mar. 5, 2009

(65) Prior Publication Data
US 2010/0182508 A1 Jul. 22, 2010

(51) Int. Cl.
H04N 9/74 (2006.01)
H04N 9/76 (2006.01)
H04N 5/222 (2006.01)

(52) U.S. Cl.
USPC ........... 348/578; 348/722; 348/584; 348/590; 348/598

(58) Field of Classification Search
USPC .......... 348/578, 659, 584, 590, 591–598, 722
See application file for complete search history.

(56) References Cited

U.S. PATENT DOCUMENTS

| 4,694,344 | A | * | 9/1987 | Flora | 348/584 |
|---|---|---|---|---|---|
| 4,853,784 | A | | 8/1989 | Abt et al. | |
| 4,858,011 | A | | 8/1989 | Jackson et al. | |
| 5,684,543 | A | * | 11/1997 | Kobayashi | 348/705 |
| 5,982,456 | A | * | 11/1999 | Smith et al. | 348/722 |
| 5,995,505 | A | * | 11/1999 | Nakasaka et al. | 370/360 |
| 6,281,941 | B1 | | 8/2001 | Windrem | |
| 6,437,834 | B1 | * | 8/2002 | Tagami | 348/705 |
| 6,768,519 | B2 | * | 7/2004 | Fujita et al. | 348/705 |
| 6,831,704 | B1 | * | 12/2004 | Windrem et al. | 348/584 |

(Continued)

FOREIGN PATENT DOCUMENTS

| EP | 0895413 | 2/1999 |
|---|---|---|
| JP | 01292976 A | 11/1989 |
| JP | 2002320140 A | 10/2002 |

OTHER PUBLICATIONS

International Search Report, dated Jul. 2, 2008.

(Continued)

Primary Examiner — Brian Yenke
(74) Attorney, Agent, or Firm — Arent Fox LLP

(57) ABSTRACT

A mix-effects bank architecture of a video switcher having a plurality of video processing units; and an internal switcher routing matrix. The internal switcher routing matrix routing, a video source currently providing a video feed to an auxiliary output and a desired new source for the auxiliary output to a video processing unit that is not contributing towards video processing and routing an output of said video processing unit to said auxiliary output. The video processing unit that is not contributing towards video processing performs a transitional effect for the auxiliary output.

24 Claims, 5 Drawing Sheets

(56) References Cited

U.S. PATENT DOCUMENTS

| | | | |
|---|---|---|---|
| 6,982,974 B1* | 1/2006 | Saleh et al. | 370/386 |
| 7,034,886 B2* | 4/2006 | Ross et al. | 348/445 |
| 7,190,412 B2* | 3/2007 | Ellett | 348/705 |
| 7,800,695 B2* | 9/2010 | Merritt | 348/598 |
| 8,068,180 B2* | 11/2011 | Nojima et al. | 348/584 |
| 8,103,131 B2* | 1/2012 | Hunkins et al. | 382/302 |
| 2001/0003469 A1* | 6/2001 | Emomoto et al. | 348/705 |
| 2001/0024240 A1 | 9/2001 | Fujita et al. | |
| 2002/0191602 A1* | 12/2002 | Woodring et al. | 370/389 |
| 2003/0229900 A1* | 12/2003 | Reisman | 725/87 |
| 2004/0128402 A1* | 7/2004 | Weaver et al. | 710/1 |
| 2005/0030432 A1* | 2/2005 | Ross et al. | 348/705 |
| 2005/0219417 A1* | 10/2005 | Ross et al. | 348/584 |
| 2006/0050180 A1* | 3/2006 | Sugimoto et al. | 348/578 |
| 2007/0182864 A1* | 8/2007 | Stoneham et al. | 348/722 |
| 2007/0188663 A1* | 8/2007 | Higashi et al. | 348/706 |
| 2009/0096929 A1* | 4/2009 | Silberstein | 348/659 |
| 2009/0167949 A1* | 7/2009 | Casper et al. | 348/584 |
| 2009/0273715 A1* | 11/2009 | Casper et al. | 348/578 |
| 2010/0103320 A1* | 4/2010 | Casper et al. | 348/659 |
| 2010/0182508 A1* | 7/2010 | Casper et al. | 348/578 |
| 2011/0205441 A1* | 8/2011 | Jones et al. | 348/659 |

OTHER PUBLICATIONS

Notice of Allowance for Japanese patent application No. 2010-522876 mailed by the Japanese Patent Office on Dec. 18, 2012 (with machine translation provided by Google Translate).
Office Action in Chinese Application No. 200780101341.6 mailed Jan. 18, 2012.
Office Action in Chinese Application No. 200780101341.6 mailed Nov. 2, 2012.
Notice of Reasons for Rejection in Japanese Application No. 2010-522876 dispatched Jul. 24, 2012.
International Preliminary Report on Patentability for PCT Application No. PCT/US2007/019110.
First Chinese Office Action for Chinese Application No. 200980112715.3.
European Patent Office, Netherlands, PCT Application No. PCT/US2010052019, dated May 30, 2012.
Written Opinion of International Search Report with PCT Application No. PCT/US2007/019110 mailed Aug. 30, 2007.
PCT International Search Report, Aug. 30, 2007 for PCT Application No. PCT/US2007/019110.
First Chinese Office Action for Chinese Application No. 2007801013416.

* cited by examiner

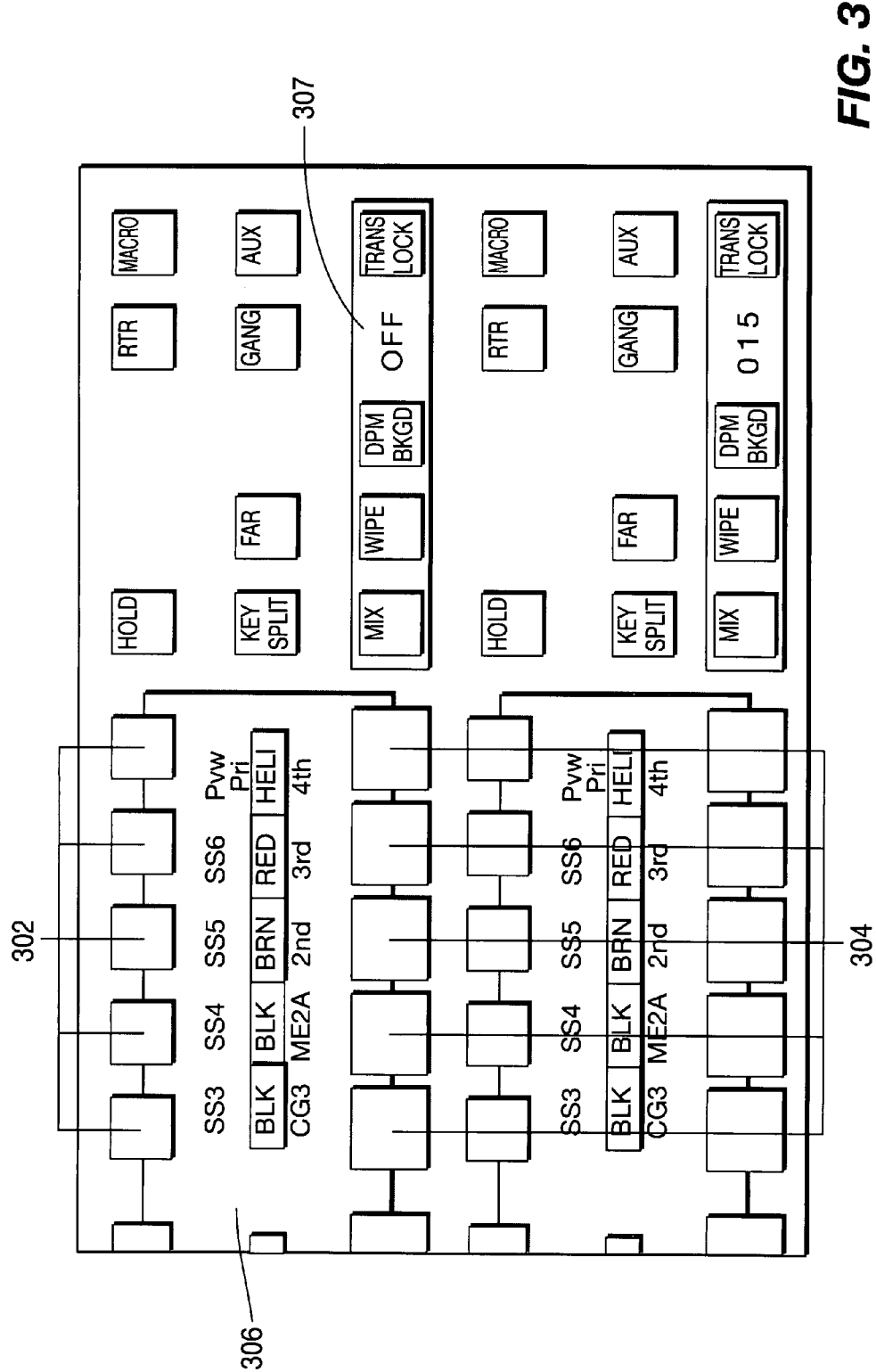

GENERATION OF VIDEO TRANSITIONS ON AN AUXILIARY BUS USING A VIDEO SWITCHER

This application claims the benefit, under 35 U.S.C. §365 of International Application PCT/US2007/019,110, filed 30 Aug. 2007, which was published in accordance with PCT Article 21(2) on 5 Mar. 2009, in English.

TECHNICAL FIELD

The present invention relates generally to video switchers having video processing units including mix-effect processors (M/E) and digital picture manipulators (DPM). More specifically, the present invention relates to a method and system providing transition effects on video switcher auxiliary buses having video processing units.

BACKGROUND OF THE INVENTION

In general, a video switcher allows you to switch from one video input signal to another. Input signals, also called "input sources" or "sources," are signals sent to the switcher from cameras, video players, and other video equipment. Thus the video switcher is a powerful tool for television production. The switcher receives multiple video input signals, processes those signals, and then outputs the processed video. Efficient real time switcher-operation is essential for live production, and can save valuable time in post-production as well. With the advent of digital electronics, video switchers have been developed that act on digitized video signals whereby processing capabilities have been improved. Additionally, it has become commonplace to incorporate into video images digital effects which, due to advanced digital processing, have become more complex and elaborate.

Today switchers may utilize video processing units having the capability to perform video processing and video image effects. These video processing units are most often mix/effects processors (M/Es), but can also be a digital picture manipulator (DPMs), a digital video effects (DVE) unit, video stores, or still stores. A video processing unit is generally shown as video processor 105 in FIG. 1. Also shown in FIG. 1 is an M/E 104, however as pointed out above, the video processor 105 can be an M/E, DPM, DVE or some other video processor.

A video processor such as an M/E typically has exceptional capabilities including two-dimensional compression and three-dimensional transformation of video images, as well as the ability to position a digitally altered video signal anywhere in a background signal.

Known switchers also create effects such as wipes, dissolves and keys. For example, a switcher can change scenes by "wiping" from one scene to another, or by dissolving one scene into another directly, or via a neutral, e.g., black, background. Additionally, a switcher can mix the output of a character generator, for example, with a background input, thereby "layering" text on top of the background in accordance with a particular key signal, e.g., a self key, luminance key or a preset pattern key. Known switchers can take virtually any input signal and layer that signal on virtually any background.

FIG. 1 illustrates a video switcher 100 useful in explaining the present invention. The internal structure of a video switcher (aka vision mixer) generally consists of a video routing matrix 102 of crosspoints plus one or more video processing units (104, 105), which, as pointed out above, is video equipment that performs digital effects such as compression and transformation and are most often M/Es 104, but can also be DVEs or DPMs, video stores, or still stores, etc.

Primary inputs 106 to video switcher 100 are connected as inputs to the switcher's routing matrix 102. The inputs may be from any video source, for example cameras, video players, and other video equipment. The outputs from the routing matrix 102 can include auxiliary outputs 110, primary outputs 108, and outputs routed to the processing units (104, 105).

As shown in FIG. 1, the outputs from the processing units (104, 105) are sent back (see re-entered inputs 107) as inputs to the routing matrix 102. Thus, the re-entered inputs 107 may be switched to the primary outputs 108, which are then taken as outputs from the routing matrix 102. In some switchers (not shown in FIG. 1) the primary outputs come directly from the processing units (104, 105).

Typically primary outputs 108 are pre-assigned to primary inputs 106 and/or the re-entered inputs 107. Primary outputs 108 are normally used for live production (primary TV feeds), whereas auxiliary outputs 110 are typically used for secondary purposes. For example, an auxiliary bus output may be used to feed studio monitors, provide feeds to other locations, or provide feeds for engineering confidence monitoring. In recent years auxiliary bus outputs have been used to feed monitors placed into the "on-air set" in a TV studio (possibly a news or weather broadcast where the monitor receiving the source is used as part of the TV broadcast). Auxiliary outputs typically have direct interface buttons on the video switcher control panel, which allows the operator to control the video feed to the auxiliary outputs, thus allowing for user interaction and quick changes. Additionally, many installations have remote auxiliary bus control panels, so that users other than the main video switcher operator can control the source selection on a particular auxiliary bus.

Although the output on an auxiliary bus can be 'switched' from one source to another using the routing matrix, in current implementations this "switching" has typically been limited to simple cuts. For example, a nearly instantaneous switch from one picture to another (i.e. one source to another source). This switch is performed without glitch during the vertical blanking period of a video field or frame. The current source can be one of the primary inputs 106 and the new source, to which to an operator switches to, can likewise be a primary input 106. This cut can by performed by changing the crosspoint in the routing matrix from one source to another.

Because the uses for auxiliary buses are increasing and it is now common for auxiliary buses to feed display devices such as plasma screens which are placed into the "on-air sets" these displays are now part of the on-air look, thus there is a desire from TV producers to improve production values by having more complex transitions and effects on these "on-air" displays. For example there is a desire for effects on these displays beyond simple cuts, such as, dissolves, wipes, mixes, or background DPM transitions. Thus, there is a need for having video processing units available for the auxiliary buses for use in providing transitional effects. For example, having M/Es, M/Es with internal DPMs, or DPMs available for providing effects for the auxiliary bus.

Indeed, performing such transition effects such as dissolves and wipes is one of the reasons that M/Es were originally created. Nowadays, video switchers have generally 1 to 5 M/Es. The U.S. patent to Kevin D. Windrem (U.S. Pat. No. 6,281,941) titled "Mix-effect bank with multiple programmable outputs," herein incorporated by reference, teaches effectively doubling the number of M/Es by giving each M/E the potential for a primary and secondary partition. As a consequence, Windrem's invention effectively increased the number of primary outputs from the switcher; a primary output being nearly always having its output derived from an M/E output.

For auxiliary buses and outputs, Windrem's concept describes a simple way to have more transition effects by simply adding more M/Es. However, M/Es are complex and expensive and over time, M/Es will continue to become more and more complex. Thus, it is not feasible to add an M/E for each of the auxiliary buses. For example there may be switches with 32 auxiliary buses and they may have a routing matrices of, for example, 128×128. The trend is to larger and larger sizes in the future.

Other prior art approaches teach, rather than simply adding more M/Es, using simplified 'lightweight' M/Es which can be variously named as light or mini M/Es or auxiliary bus effects processors. For example, providing a simple mixer with two inputs in each auxiliary bus. This solution can be extended by adding third and fourth inputs to key signals (such as video bugs) over the background. However, with the 'lightweight' M/Es there is still the problems of adding complexity and cost into the switcher.

Thus the prior art generally teaches adding more and more M/Es, DPMs, etc. into switches or using very limited M/Es, however this results in either having a massive duplication of these mixing resources in each auxiliary bus, or the feature is limited and inflexible and only works with certain auxiliary buses. Thus, there is a desire for a video switcher to flexibly provide transition effects on the video switcher's auxiliary buses, while minimizing the complexity of the video switcher.

Whatever the precise merits, features, and advantages of the above-mentioned prior art techniques, none of them achieve or fulfill the purposes of the present invention.

SUMMARY OF INVENTION

The present invention provides a method and system implemented in a mix-effect architecture. The mix-effect architecture includes a plurality of video processing units (104, 105) and a crosspoint switch (102). The method includes receiving a selection for a new source, where the new source is to be transitioned to from an old source (502); identifying a video processing unit (104, 105) that is not contributing towards video processing (504); routing the new source and the old source to the identified video processing unit (104, 105) that is not contributing towards video processing (step 506); routing an output of said identified video processing unit (104, 105) to an auxiliary bus (step 507); performing a transitional effect between the old source and the new source using the identified video processing unit (104, 105) that is not contributing towards video processing (step 508); and routing the new source to the auxiliary bus (step 509).

The present invention provides for a mix-effects bank architecture. The mix-effects bank architecture including: a plurality of video processing units (104, 105); and an internal switcher routing matrix (102), the mix-effects bank architecture identifying which of the plurality of video processing units (104, 105) is not contributing towards video processing and utilizing the identified video processing unit to perform a transitional effect by configuring the internal switcher routing matrix (102). The internal switcher routing matrix (102) is configured by routing the current source and the new source to inputs of the identified video processing unit and routing the output of the identified video processing unit to the auxiliary bus output (110).

The video processing unit (104, 105) may be, for example, mix/effects engines (202), but can also be mix/effects engines with internal digital picture manipulators (204), a digital picture manipulators (206), digital video effects (DVE) unit, video stores, or still stores. The mix/effects engines may further include primary (202a) and secondary partitions (202b).

BRIEF DESCRIPTION OF THE DRAWINGS

FIGS. 3 and 4 illustrate two sample panel layouts based on the teachings of the present invention.

DETAILED DESCRIPTION OF THE INVENTION

Figure 1:
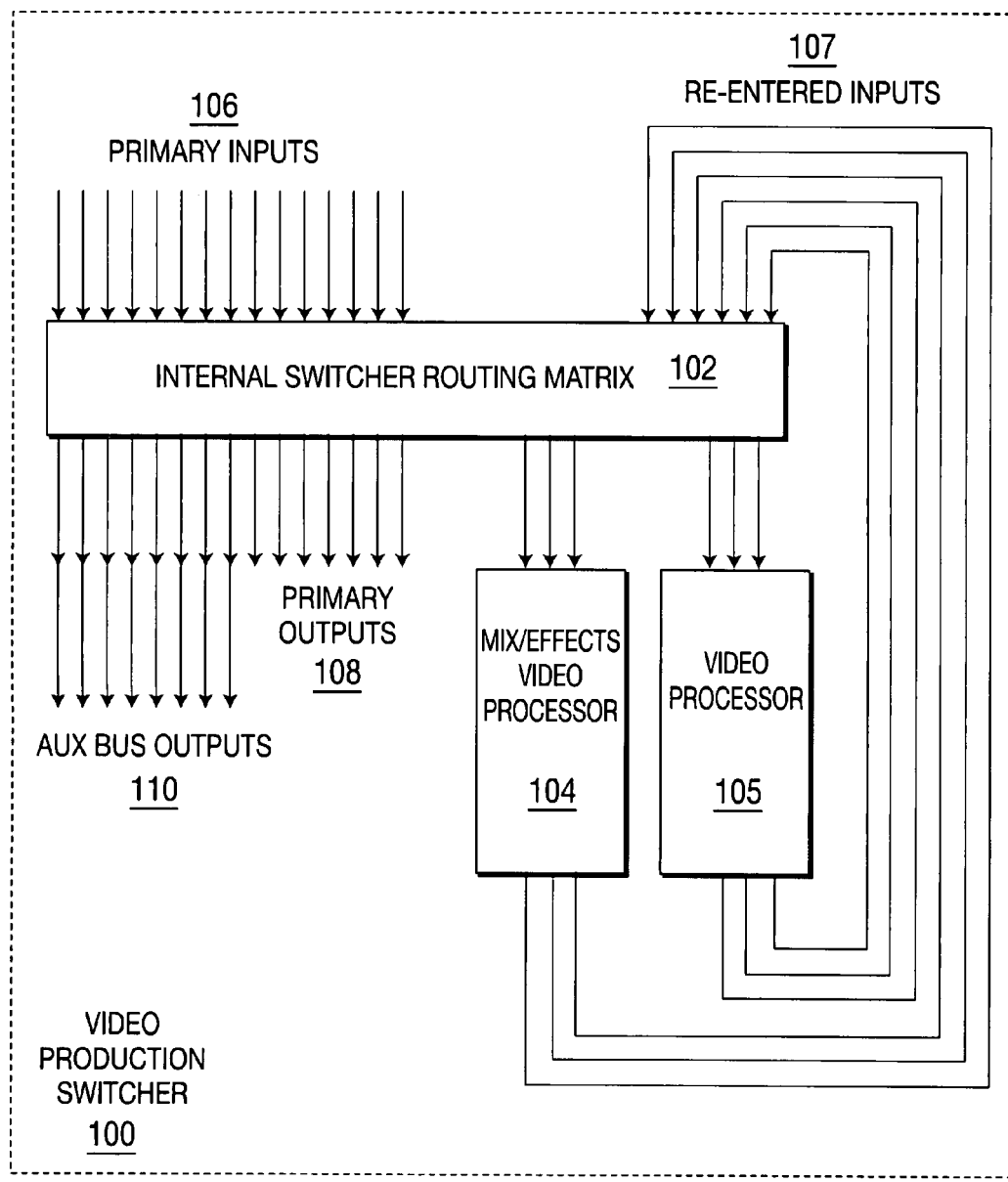
FIG. 1 illustrates a video production switcher.

While this invention is illustrated and described in preferred embodiments, the invention may be produced in many different configurations. There is depicted in the drawings, and will herein be described in detail, preferred embodiments of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

FIG. 1 illustrates a video switcher 100 useful in explaining the operation of the present invention. The internal structure of a video switcher generally consists of a video routing matrix 102 of crosspoints plus one or more video processing units 104, 105. The video switcher 100 has inputs for providing video feeds and outputs as discussed above. The video processing units 104, 105 are most often M/Es 104, but can also M/Es with internal digital picture manipulators (DPM), video processing engines with internal DPM, DVEs, video stores, or still stores, etc. While specific types of video processing units are illustrated in the Figures, it is intended that any video processing engine can be substituted for the general term video processing unit.

Figure 2A:
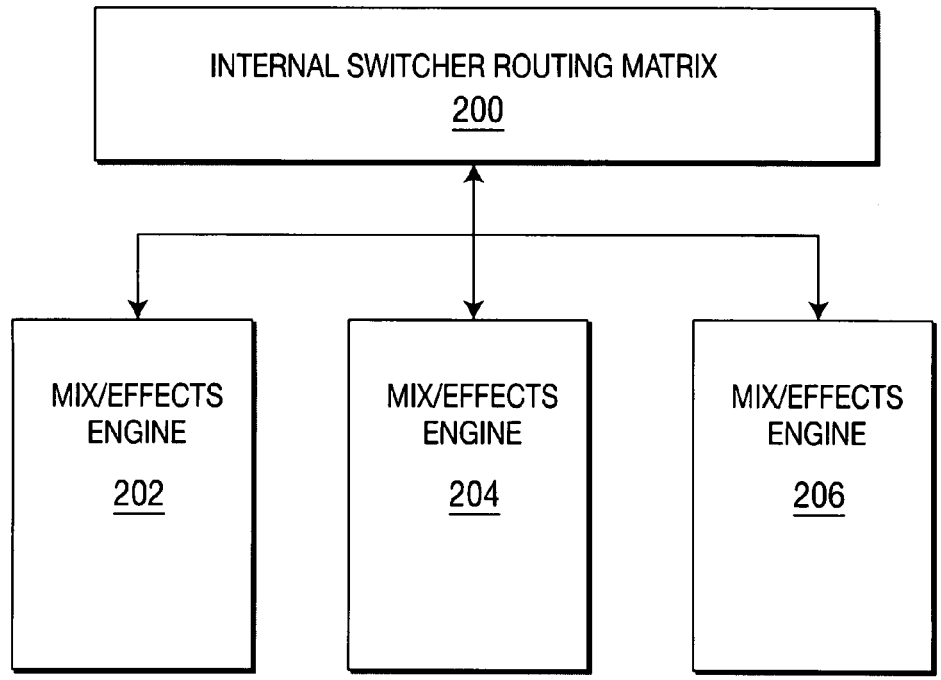
FIG. 2a illustrates an embodiment of an inventive mix-effects bank architecture.

FIG. 2a illustrates a mix-effects bank architecture. The mix-effects bank architecture includes an internal switcher routing matrix 200 and a plurality of video processing units, for example, a mix/effect engine 202, a mix/effect engine with internal digital picture manipulator (DPM) 204, and a video processing engine with internal DPM 206. For ease of understanding additional units are not shown. In addition, each of the mix-effect engines 202, 204 may further comprise a primary and secondary partition, for example a primary and secondary partition as described in the patent to Windrem. Thus, the present invention is applicable to M/Es or M/Es with partitions.

Referring to FIGS. 1 and 2a, when the video production switcher receives a request for a transitional effect for a particularly auxiliary output 110, a video processing unit is identified which is not contributing towards video processing of a video feed. For example, the video production switcher will determine if a unit 202, 204, or 206 is currently contributing or not to video processing, for example "on-air" video processing. Upon making the determination of which unit 202, 204, or 206 is available the internal switcher routing matrix 200 will switch both the current source providing the video feed to the particularly auxiliary output and the new desired source to the inputs of the identified unit 202, 204, or 206. In addition to switching the two sources to the identified unit 202, 204, or 206, the internal switcher routing matrix 200 will switch the output of the identified unit to the particular auxiliary output. The identified unit 202, 204, or 206 will perform the transition from the current source to the new source, thereby utilizing the identified unit 202, 204, or 206. Upon completion of the transition effect the identified unit 202, 204, or 206 is released for re-use. That is the internal switcher routing matrix 200 routes the new source directly to the particular auxiliary output. Thus, a video processing unit's processing power is temporarily borrowed to perform this transitional effect for the duration of the assignment.

Alternatively, only one partition of an M/E, primary or secondary partition, is borrowed for the effect. In this alternative embodiment a partition of the M/E is identified for use in the transitional effect. For example, a secondary partition which might not be being used at all in some installations of the video switcher. This temporary borrowing of the M/E's processing power provides the ability to provide a mix, wipe or background DPM between sources on an auxiliary bus without having to dedicate video processing units to the auxiliary buses.

Figure 2B:
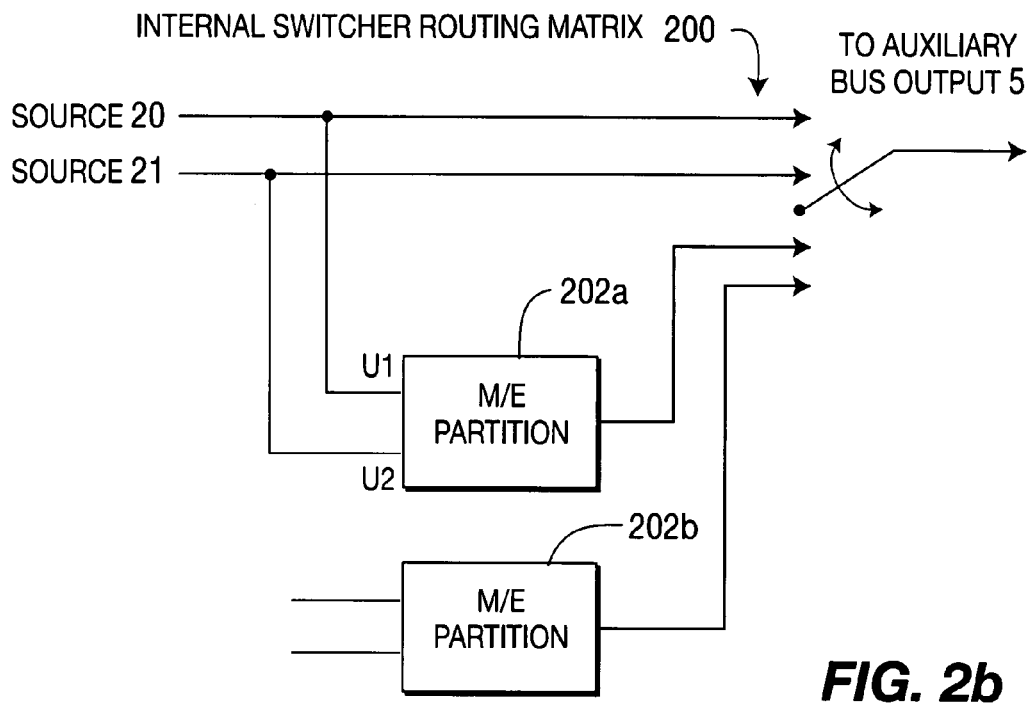
FIG. 2b illustrates an example embodiment of the internal structure of a video switcher per the teachings of the present invention.

For example, FIG. 2b shows a portion of the video production switcher according to the present invention. This video production switcher includes M/E partitions 202a and 202b, one partition can be a primary and the other a secondary partition of an M/E 202 as shown in FIG. 2a. In this example it is assumed that source 20 is currently providing a video feed to auxiliary bus output 5, which is an output of the video production switcher and is fed out of the video production switcher through an auxiliary bus output, for example, one of the aux bus outputs 110 in FIG. 1. Thus the current source 20 would be connected directly to the auxiliary bus output 5 through the internal routing matrix 200. In this example a transition to source 21 from current source 20 is desired. The sources 20 and 21, may be for example, primary inputs 106 to the internal switcher routing matrix 102, as shown in FIG. 1 and may be supplied with video feeds from any type of video source.

Still referring to FIG. 2b, an example of providing an effect, such as a mix, wipe or background DPM transition, will be illustrated. Typically an operator would select the auxiliary output bus, select the type of transition and also select the new source. When the desired auxiliary output is selected, the video production switcher knows source 20 is the current source, which is routed through the internal switching matrix to auxiliary bus output 5 and providing the video feed to the auxiliary output. To provide the transition effect it is determined that M/E partition 202a is available and can be borrowed for the video processing. The source 20, which is actively providing the feed to auxiliary bus 5, is routed through the internal switching matrix 200 to input U1 of M/E partition 202a, source 21 is routed to input U2 of M/E partition 202a, and the output of M/E partition 202a is routed to the auxiliary bus output 5. The M/E partition 202a performs the transitional effect, such as a mix, wipe or background DPM. At the end of the transition, source 21 is directly routed to auxiliary bus output 5 and the M/E is disconnected. At this point the M/E partition 202a is freed to perform another transitional effect for possibly a different set of inputs and auxiliary output. Thereby, the video production switcher performs a transitional effect, while switching from source 20 to source 21, for the auxiliary output by temporarily borrowing an M/E.

In this example two partitions of an M/E are illustrated, however as shown in FIG. 2a there is typically a plurality of types of video processing units, where each of the mix-effect engines may further comprise a primary and secondary partition. Here, the internal switching matrix 200 routes the sources (i.e. 20 and 21) for which a transitional effect is desired to any of the plurality of video processing units, which are available, i.e. not contributing towards video processing. This can be a primary or secondary partition of an available M/E or any of the above discussed video processing units. The identified M/E, or the primary or secondary partition of the M/E, then performs a transitional effect. Also, the above discussion makes reference to using one M/E, or a partition of an M/E, to perform one transitional effect. However, if more than one M/E, or partition of an M/E, is available for use by the auxiliary bus, then multiple M/Es or M/E partitions can be utilized for simultaneous transitions. Thus, the number of simultaneous effect transitions can be equal to the number of currently unused M/E partitions.

As pointed out above, a typical video switcher has a plurality of video processors, which can be M/Es, M/E partitions, M/E with internal DPM, DPMs, etc. The choice of which video processor to use for the transition effect on the auxiliary bus can be determined a number of ways. In one embodiment a user will determine the overall configuration of the switcher by assigning the various resources of the video switch to the needs of the video production. In other words, in configuring the deployment of a video switch certain video processing units will be configured and dedicated for utilization on the main video feeds and effects processing. A number of the remaining (non-used) video processing units will be configured for use by the auxiliary bus for transitions. During "on-air" production the video processing units configured for use by the auxiliary bus can then be used for the transition effects as described above.

In an alternative embodiment, a video processing unit for use by the auxiliary bus can be determined during "on-air" production, by the operator using any video processing unit which is not actively being utilized for the main video feeds. In a further embodiment the video switcher itself will determine which video processing unit is available for use by the auxiliary bus according to the video switch configuration. Again a video processing unit can be any of an M/E or M/E partition, M/E with internal DPM, etc.

Once the video processing unit is determined for use on the auxiliary bus, then the type of effects can be programmed and tested. For example, if an M/E partition is to be used for a wipe transition effect, an operator can prepare for and test the wipe transition for use as an auxiliary bus transition. To prepare and test the transition effect it is necessary to use a control panel and/or a graphical user interface (GUI) (not shown) suitable for the switcher. Illustrative examples of a control panel are shown in each of FIGS. 3 and 4. An effective way to set up and test the effect is to use a combination of the control panel and a GUI menu.

To set up an effect, for example a wipe transition, it is necessary to take control of an M/E or M/E partition by using a combination of the control panel and a GUI menu to select and program the options available for the wipe transition. For example, setting the transition duration, wipe pattern, border, softness, etc. for the M/E partition, is performed using a combination of control panel and GUI menu setting as appropriate for the switcher. Once this effect is setup and tested, it can be used for the auxiliary bus transition. The parameter settings of the transition effect can be saved into a memory register and recalled to program an M/E partition to perform the transition on the auxiliary bus. Different settings for the same effect or settings for different effects can be programmed into different memory registers and saved. To perform an effect the parameters in a memory register simply need be recalled and the effect will be programmed into a video processing unit. The programmed video processing unit can then be used for transitioning from any input to another input for any auxiliary output.

Figure 4:
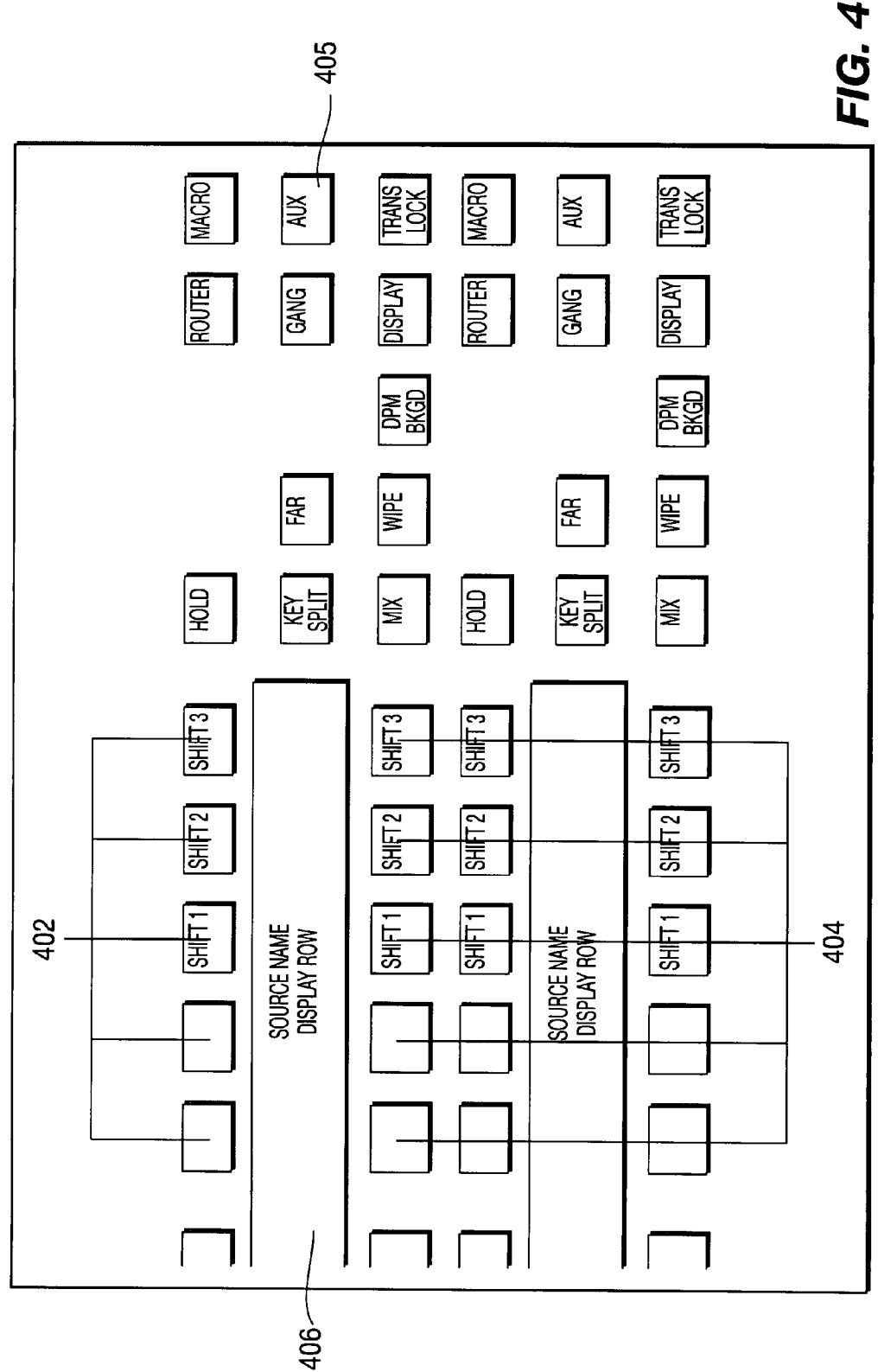

FIGS. 3 and 4 illustrate two sample panel layouts of a video switcher based on the teachings of the present invention. In both of these sample panels, as illustrated by FIGS. 3 and 4, control of the auxiliary bus outputs 110 and routing matrix 102, as shown in FIG. 1, is performed by manipulation of various buttons. For example, in FIG. 3 the control panel delegates two rows of buttons to auxiliary bus control. The top row of buttons, designated by reference numeral 302, is used to select an auxiliary bus output of the video switcher, for example, one of the outputs 110 as shown in FIG. 1. The second row of buttons, designated by reference numeral 304, is used to select an input source, for example one of the inputs 106 in FIG. 1.

As shown in FIG. 3, the two rows of buttons include a LED/LCD panel 306 (between the two rows) providing information as to the current source providing a feed for the auxiliary output buses. To perform a simple cut, an operator must select the auxiliary output bus on which the cut is to be performed. This can be done by pressing a button on the top row 302 associated with the desired auxiliary output bus. The current selected auxiliary output bus may be indicated by an illuminated button, LED/LCD panel 306, or some other means to show which auxiliary output bus is currently selected. In FIG. 3, a description of the current source is provided by the LED/LCD panel 306 between the buttons. The user then presses a button on the lower row 304 associated with the source input to which the user intends to cut to. This will cause a simple cut to the new source on the selected auxiliary bus.

The procedure to perform a cut using the panel illustrated on FIG. 4 is similar to that of FIG. 3 except that the top row of buttons, designated by reference numeral 402, and the second row of buttons, designated by reference numeral 404, are assigned to have multiple functions and become associated with the auxiliary busses, as described in FIG. 3, when the Aux button 405 is pressed. Therefore, when the user wishes to manipulate and control the auxiliary buses, the user first presses Aux 405, then the rows of buttons (402, 404) may operate as described above with reference to FIG. 3. Here again both rows (402, 404) can be marked with an indication that shows the current selected auxiliary bus and the current source on that bus by panel 406. Pressing a button on the upper row 402 selects an auxiliary bus and pressing a button on the lower row 404 will cause a simple cut to the new source associated with the pressed button on the selected auxiliary bus.

As pointed out above, cuts have been known in the prior art, accordingly the present invention introduces the functionality of performing a transition effect, such as a dissolve or wipe, to the new source instead of a simple cut. The functionality is performed by temporarily borrowing a video processor such as an M/E or M/E partition and upon completion of the transition effect, the M/E or M/E partition is released and can be utilized by another auxiliary bus.

Referring to FIG. 3, an example of performing a mix, wipe or background DPM transition will be described. Initially, that is prior to performing the transition, the transition effect must be set up in the video switcher. A software graphical user interface (GUI) or switcher control panel is used to define: what video processor is to be used for the transition effects (in this example an M/E partition will be used). Further, the transition duration, defining the time duration for which the transition is to occur, is defined. For example, to setup a wipe transition, it is necessary to take control of that M/E partition using the GUI or control panel, and select the wipe pattern, border, softness, etc., for the M/E partition. A number of these effects can be learned and programmed into effects memory registers and recalled on the M/E partition prior to it being used for the transition, so a variety of effects can implemented.

After the M/E partition has been set up, the operator may perform transitional effects on auxiliary buses. To perform an effect such as a mix, wipe, or Background DPM transition, the operator must ensure the desired auxiliary bus is the currently selected bus on the control panel. This is indicated by the panel in FIG. 3, by either the currently selected bus having its button 302 illuminated or an indication is presented on the panel 306. If the desired auxiliary bus is not the currently selected bus, the operator presses the appropriate button 302 for selecting the desired auxiliary bus. Upon ensuring that the desired auxiliary bus is the currently selected bus, the panel 306 will also indicate the current video source providing a video feed to the auxiliary bus output.

The operator then presses the button for the desired effect. For example, pressing the DISS button (for a mix), Wipe button or DPM BKGD (for DPM background transition) as shown on panel 307 in FIG. 3. The pressed button on panel 307 then blinks to indicate the selected activity. Upon pressing either of the DISS, Wipe or DPM BKGD buttons, the video routing matrix 102 routes the current source on the selected auxiliary bus to the available video processor such as an M/E partition (an unused primary or secondary ME partition) and the output of this M/E partition is routed to the auxiliary bus output.

The operator then presses the new source to be transitioned to. For example, the operator presses a button 304 associated with the new source. Upon the operator pressing the button 304 associated with the new source, the video switcher routes the new source on the auxiliary bus to the M/E partition. The M/E partition now performs the selected transition from the current source to the new source. The panel in FIG. 3 indicates this transition activity by having the pressed DISS, Wipe or DPM BKGD button on panel 307 stop flashing and go high tally for the duration of the transition effect.

At the conclusion of the transition the video switcher 100 directly routes the new source to the auxiliary bus output, and releases the M/E partition for its next use by the same or another auxiliary bus. In addition, the DISS, Wipe or DPM BKGD button is no longer illuminated indicating the transition is completed.

The video switcher has completed a transition on an auxiliary bus by temporarily borrowing the M/E partition and at the conclusion releasing the M/E partition for use by another auxiliary bus output. The video switcher is controlled by a combination of hardware and software, which changes the internal routing to connect the current source and new source to an unused video processor, which in this example was an M/E partition. The M/E partition transitions to the new source using the programmed transition effect and at the conclusion of the transition the M/E partition is released for its next use.

Figure 5:
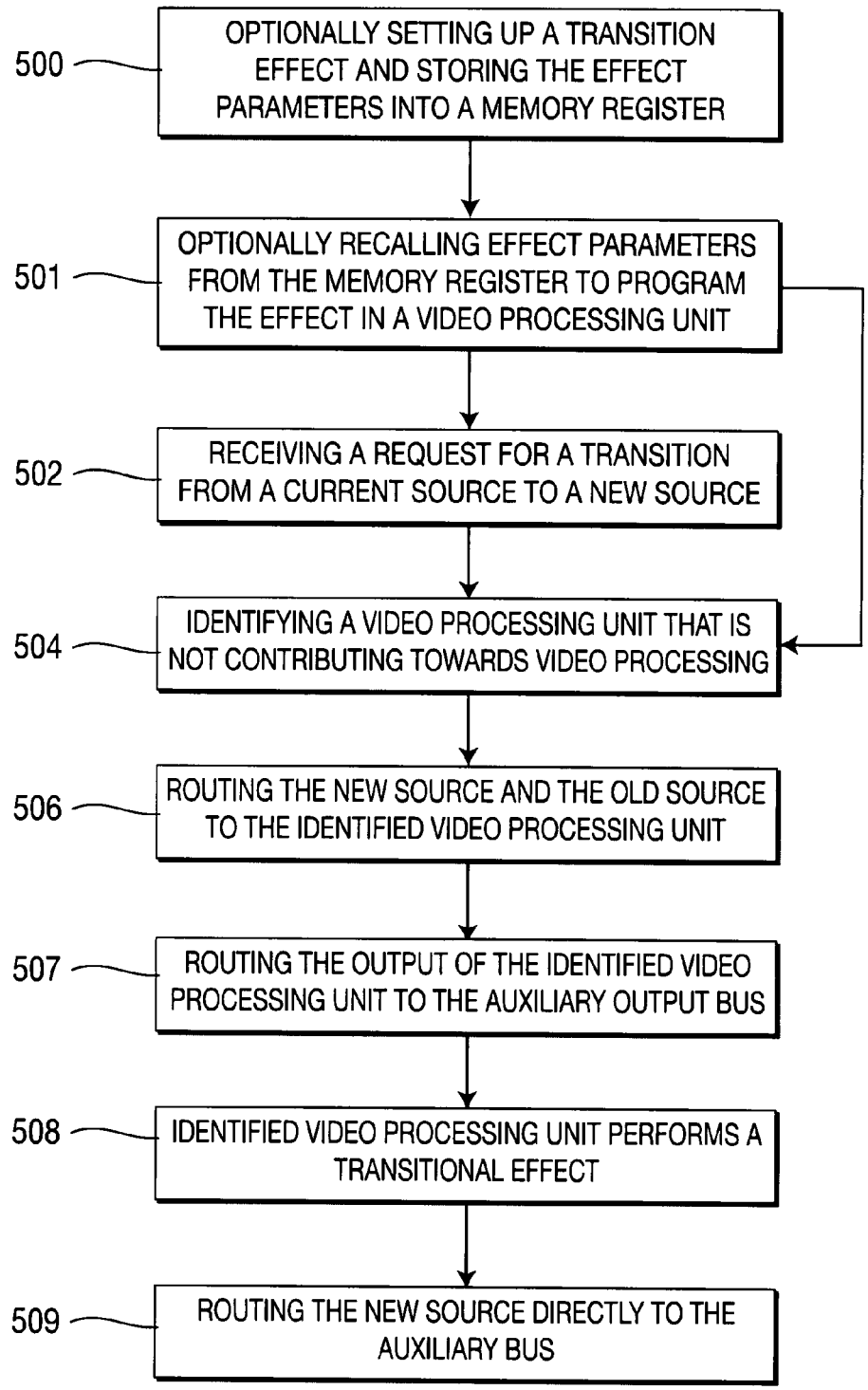
FIG. 5 illustrates an exemplary chart of the present invention, as implemented in a mix-effect architecture having a plurality of mix-effect engines, with each mix-effect engine further comprising a primary and secondary partition.

FIG. 5 illustrates an example embodiment describing a method according to the present invention, as implemented in a video switcher or mix-effect architecture. For example, a mix-effect architecture similar to the one illustrated in FIGS.

1, 2A and 2B above. The method may be implemented for providing a transition effect, such as a mix, wipe, or DPM background transition. The transition being from a source currently providing a video feed to an auxiliary output to a desired new source for the auxiliary output. FIG. 5 assumes a video processing unit, for example a mix-effect engine (M/E) having two partitions, such as a primary and secondary partition. However, the invention is applicable to any number of partitions, an M/E without partitions or any other video processing unit for example the ones described above.

As shown in FIG. 5, box 500, an effect is optionally set up beforehand and saved in a memory register. For example, setting the transition duration, wipe pattern, border, softness, etc., is performed using a combination of control panel and GUI menu setting as appropriate for the switcher. The parameter settings of the transition effect are saved into a memory register and recalled to program a video processor to perform the transition on the auxiliary bus. Different settings for the same effect or settings for different effects can be programmed into different memory registers and saved.

FIG. 5, box 501 describes optionally recalling the memory register in order to program an effect. That is, the parameters in a memory register simply need be recalled and the effect will be programmed into a selected video processing unit. The programmed video processing unit can then be used for the transition effect.

A transition on a selected auxiliary output from a current source to a new source may be initiated upon receiving a selection for a transition effect such as a DISS, Wipe or DPM BKGD (box 502). Upon initiation of the transition, an available video processing unit (for example, M/E partition in FIG. 2B, 202a) is temporarily borrowed to provide the video processing unit for the transition effect (box 504). An available video processing unit is identified as one not contributing towards video processing. A number of ways of identifying an available video processing unit wag discussed above. When the video processing unit is identified, optionally the effects parameters are recalled from memory and the video processing unit is programmed with the parameters from the memory register. Otherwise, the video processing unit could be manually programmed or default parameters used.

Following the identification of the video processing unit, the current source input and a selected new source input are both routed to the identified available video processing unit (box 506). For example, FIG. 2b, source 20 and 21 routed to M/E partition 202a.

The output of the available video processing unit is routed to the auxiliary bus output (507). For example, in FIG. 2b, the output of M/E partition 202a routed to auxiliary bus 5.

A transitional effect is then performed using the identified video processing unit (box 508).

Following the transitional effect to the new source, the new source is routed directly to the auxiliary bus output (box 509). For example, in FIG. 2b, the new source 21 is routed directly to the auxiliary bus 5 for output.

The video processing unit which was used for this transitional effect is now free to be used for another transitional effect, either by the same auxiliary bus output or another auxiliary bus output.

Although the above discussion make reference to using one video processing unit, plurality of video processing units can be assigned to the auxiliary bus. Having multiple video processing units assigned as resources to the auxiliary bus allows for simultaneous transition effects. It is well within the scope of the present invention, to assign more resources of the video switcher to the auxiliary busses and allow more simultaneous transitions.

A method and system has been shown in the above embodiments for providing transitional effects on video switcher auxiliary bus. While various embodiments have been shown and described, it will be understood that there is no intent to limit the invention by such disclosure, but rather, it is intended to cover all modifications falling within the spirit and scope of the invention, as defined in the appended claims.

In an embodiment of the present invention, some or all of the method components are implemented as a computer executable code. Such a computer executable code contains a plurality of computer instructions that when performed in a predefined order result with the execution of the tasks disclosed herein. Such computer executable code may be available as source code or in object code, and may be further comprised as part of, for example, a portable memory device or downloaded from the Internet, or embodied on a program storage unit or computer readable medium. The principles of the present invention may be implemented as a combination of hardware and software and because some of the constituent system components and methods depicted in the accompanying drawings may be implemented in software, the actual connections between the system components or the process function blocks may differ depending upon the manner in which the present invention is programmed.

The computer executable code may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method in a video-switching architecture including a plurality of video processing units said method comprising:
   receiving a selection for a new video source for an auxiliary bus output to which a transition is desired from a current video source, wherein the desired transition has a defined duration;
   identifying a video processing unit that is not contributing towards video processing;
   routing said new video source and said current video source to said identified video processing unit that is not contributing towards video processing;
   routing an output of said identified video processing unit to the auxiliary bus output of said architecture;
   performing a transitional effect between said current video source and said new video source using said identified video processing unit; and
   upon completion of the transitional effect, routing said new video source to said auxiliary bus output of said architecture bypassing said identified video processing unit and releasing the identified video processing unit for use in performing a video effect for a different output.

2. The method of claim 1, wherein identifying a video processing unit further includes identifying a primary or secondary partition of a mix-effect engine that is not contributing towards video processing, wherein either said primary partition or said secondary partition is used to perform said transitional effect.

3. The method of claim 1, wherein identifying a video processing unit identifies said identified video processing unit according to configuration set up by a user and said identified video processing unit comprises a primary or secondary partition of a mix-effect engine.

4. The method of claim 3, wherein said configuration specifies video processing units that are used for said auxiliary bus output of said architecture.

5. The method of claim 3, wherein said configuration specifies duration of said transitional effects.

6. The method of claim 1, wherein said method further comprising storing video processing unit settings in a memory register, said stored settings recalled and used in performing transitions effects.

7. The method of claim 1, wherein said transitional effect is a wipe, mix, dissolve or digital picture manipulator background transition.

8. The method of claim 1, wherein upon completion of the transitional effect, the identified video processing unit is released for use for another transitional effect.

9. The method of claim 1, wherein the identified video processing unit is not dedicated to the auxiliary bus.

10. The method of claim 1, further comprising releasing the video processing unit for reuse by a primary output upon completion of the transition effect.

11. The method of claim 1, wherein a capacity of the video processing unit is temporarily borrowed in order to perform the transition effect to be output to an auxiliary bus to which it is not dedicated.

12. The method of claim 1, identifying a video processing unit that is not contributing toward video processing includes determining whether the video processing unit is currently contributing to on-air video processing.

13. The method of claim 1, receiving a configuration of a plurality of at least two video processing units, wherein a first video processing unit is dedicated to at least one primary bus output and the remaining video processing unit is available for temporary use by an auxiliary bus for a transition effect after which it is released for re-use by the primary output.

14. A video-switching architecture comprising:
   a plurality of video processing units, wherein the video switching architecture is configured to identify identifying one of said video processing units, which is not contributing towards video processing; and
   an internal switcher routing matrix, said internal switcher routing matrix (200) routing, on an auxiliary bus, a new video source and a current video source to said identified video processing unit that is not contributing towards video processing and utilizing said identified video processing unit to perform a transitional effect, wherein the transitional effect has a defined duration, and further
   wherein, upon completion of the transition effect, said internal switcher routing matrix routes said new video source to an auxiliary bus output of said architecture bypassing said identified video processing unit and the identified video processing unit is released for use in performing a video effect for a different output.

15. The video-switching architecture of claim 14, wherein upon completion of the transitional effect, the identified video processing unit is released for use for another transitional effect.

16. The video-switching architecture of claim 14, wherein a video processing unit comprising one of a mix/effects engine, a mix/effects engines with internal digital picture manipulators, a digital picture manipulators.

17. The video-switching architecture of claim 16, wherein said video processing unit further comprising a mix-effect engine with primary and secondary partition and said internal switcher routing matrix routing to said primary or secondary partition in a mix-effect engine that is not contributing towards video processing and utilizing said identified primary or secondary partition to perform a transitional effect.

18. The video-switching architecture of claim 17, wherein an identification of said mix-effect engine that is not contributing towards on-air video processing is made at runtime.

19. The video-switching architecture of claim 17, wherein said identifying means identifies said mix-effect engine that is not contributing towards on-air video processing according to configuration set up by a user.

20. The video-switching architecture of claim 19, wherein said transitional effect is a wipe, mix, dissolve or digital picture manipulator background transition on an auxiliary bus output.

21. The video-switching architecture of claim 14, wherein video processing unit settings for a transitional effect are stored in a memory register, said stored settings used in performing transitions effects.

22. A video switcher having primary outputs and auxiliary outputs comprising:
   a plurality of video processing units; and
   an internal switcher routing matrix, said internal switcher routing matrix (200) routing, on an auxiliary bus, a video source currently providing a video feed to an auxiliary output and a desired new source to a video processing unit that is not contributing towards video processing and routing an output of said video processing unit to said auxiliary output, wherein the video processing unit that is not contributing towards video processing performs the transitional effect, wherein the transitional effect has a defined duration and upon completion of the transitional effect, the internal switcher unit routes said new video source directly to said auxiliary bus output of said architecture bypassing said identified video processing unit and the identified video processing unit is released for use in performing a video effect for a different output.

23. The video switcher of claim 22, wherein a video processing unit settings for a transitional effect are stored in a memory register, said stored settings used in performing transitions effects.

24. The video switcher of claim 22, wherein said transitional effect is a wipe, mix, dissolve or digital picture manipulator background transition and the video processing unit is one of a mix/effects engine, a mix/effects engines with internal digital picture manipulators, a digital picture manipulators.

* * * * *